US011260319B2

(12) United States Patent
Choi et al.

(10) Patent No.: US 11,260,319 B2
(45) Date of Patent: Mar. 1, 2022

(54) SOLID PHASE EXTRACTION METHOD USING MICRO DEVICE

(71) Applicant: LG Chem, Ltd., Seoul (KR)

(72) Inventors: Junwon Choi, Daejeon (KR); Dae Hun Kim, Daejeon (KR); Seonyoung Jegal, Daejeon (KR); Ye Hoon Im, Daejeon (KR); Yeu Young Youn, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/767,830

(22) PCT Filed: Aug. 7, 2019

(86) PCT No.: PCT/KR2019/009901
§ 371 (c)(1),
(2) Date: May 28, 2020

(87) PCT Pub. No.: WO2020/040458
PCT Pub. Date: Feb. 27, 2020

(65) Prior Publication Data
US 2020/0376410 A1 Dec. 3, 2020

(30) Foreign Application Priority Data

Aug. 21, 2018 (KR) .................. 10-2018-0097181
Aug. 6, 2019 (KR) .................. 10-2019-0095313

(51) Int. Cl.
*B01D 11/02* (2006.01)
*B01L 3/00* (2006.01)
(Continued)

(52) U.S. Cl.
CPC ...... *B01D 11/0288* (2013.01); *B01D 11/0284* (2013.01); *B01L 3/5027* (2013.01);
(Continued)

(58) Field of Classification Search
CPC ............ B01D 11/0288; B01D 11/0284; B01D 11/0292; B01D 2011/007; B01D 11/0215;
(Continued)

(56) References Cited

U.S. PATENT DOCUMENTS 6,117,343 A     9/2000  Nagamatsu et al.
10,684,279 B2 * 6/2020  Kanai .................. G01N 1/34
(Continued)

FOREIGN PATENT DOCUMENTS

CN      201637729 U     11/2010
CN      202748263 U      2/2013
(Continued)

OTHER PUBLICATIONS

Carasek, et al., Basic principles, recent trends and future directions of microextraction techniques for the analysis of aqueous environmental samples, Trends in Environmental Analytical Chemistry, Jul. 2018, 18 pages, vol. 19, XP055764020.
(Continued)

*Primary Examiner* — Joseph W Drodge
(74) *Attorney, Agent, or Firm* — Lerner, David, Littenberg, Krumholz & Mentlik, LLP

(57) ABSTRACT

The present invention provides a solid phase extraction method using a micro device having a dam forming portion including a dam, the solid phase extraction method comprising the steps of: (i) injecting a solvent and a filler into the micro device, moving the solvent to the dam forming portion, the dam allowing the solvent to flow therethrough and preventing the filler from passing therethrough, and adsorbing a material to be separated onto the filler in the dam forming portion; and (ii) extracting, from the filler, the adsorbed material, wherein the micro device is rotated with respect to a central axis during one of steps (i) and (ii), and
(Continued)

the rotation of the micro device is performed at an angular velocity defined by equation 1.

10 Claims, 6 Drawing Sheets

(51) Int. Cl.
*G01N 1/40* (2006.01)
*B01D 11/00* (2006.01)

(52) U.S. Cl.
CPC .......... *G01N 1/405* (2013.01); *B01D 11/0292* (2013.01); *B01D 2011/007* (2013.01); *B01L 2200/0631* (2013.01); *B01L 2400/086* (2013.01)

(58) Field of Classification Search
CPC .... B01D 11/02; B01D 11/0219; G01N 1/405; G01N 2030/009; G01N 1/40; G01N 2001/4061; G01N 30/6091; G01N 30/6095; B01L 2200/0631; B01L 2400/0409; B01L 3/502753; B01L 3/5027; B01L 2300/0803; B01L 2200/0668; B01L 2300/0816; B01L 2400/0487; B01L 2400/086; B01L 2200/086; B01L 3/502746; B01L 2200/0647; B01L 2200/668; B04B 5/00; B04B 5/10; B04B 11/00; B04B 11/02; B04B 11/04; B04B 11/06; C02F 1/38; C02F 1/385; C02F 1/28
See application file for complete search history.

(56) References Cited

U.S. PATENT DOCUMENTS

| | | | |
|---|---|---|---|
| 11,065,557 B2* | 7/2021 | Jegal | B01L 3/502753 |
| 2002/0178797 A1 | 12/2002 | Pawliszyn | |
| 2004/0154985 A1 | 8/2004 | Shekunov et al. | |
| 2007/0240777 A1 | 10/2007 | Sasano et al. | |
| 2009/0035847 A1 | 2/2009 | Cho et al. | |
| 2009/0084680 A1 | 4/2009 | Chung et al. | |
| 2009/0148348 A1* | 6/2009 | Pettigrew | C08J 7/126 422/400 |
| 2010/0135859 A1* | 6/2010 | Sa | B01L 3/502723 422/400 |
| 2011/0079556 A1* | 4/2011 | Anderson-Smith | C07K 1/34 210/633 |
| 2011/0185827 A1 | 8/2011 | Asano et al. | |
| 2012/0160038 A1 | 6/2012 | Wells et al. | |
| 2014/0109972 A1 | 4/2014 | Garcia Da Fonseca et al. | |
| 2014/0242721 A1 | 8/2014 | Kellogg et al. | |
| 2015/0051383 A1* | 2/2015 | Doucette | B01L 3/5021 530/419 |
| 2016/0121329 A1* | 5/2016 | Kinahan | B01L 3/502738 422/505 |
| 2016/0209393 A1* | 7/2016 | Dimson | G01N 30/6069 |
| 2019/0366341 A1 | 12/2019 | Cho et al. | |
| 2020/0025755 A1* | 1/2020 | Brewer | C07K 1/34 |
| 2020/0215455 A1 | 7/2020 | Jegal et al. | |
| 2021/0060580 A1* | 3/2021 | Patrick | B04B 5/00 |

FOREIGN PATENT DOCUMENTS

| | | |
|---|---|---|
| CN | 205287713 U | 6/2016 |
| CN | 205307865 U | 6/2016 |
| CN | 106745443 A | 5/2017 |
| CN | 107551598 A | 1/2018 |
| GB | 1487669 A | 10/1977 |
| GN | 103372328 A | 10/2013 |
| GN | 106124645 A | 11/2016 |
| JP | H09184830 A | 7/1997 |
| JP | 2003521711 A | 7/2003 |
| JP | 2007170903 A | 7/2007 |
| JP | 2009216586 A | 9/2009 |
| JP | WO2010013704 A1 | 1/2012 |
| JP | 5017150 B2 | 9/2012 |
| JP | 2014508952 A | 4/2014 |
| JP | 2014092464 A | 5/2014 |
| KR | 20070032639 A | 3/2007 |
| KR | 20080022025 A | 3/2008 |
| KR | 20140060263 A | 5/2014 |
| KR | 101467561 B1 | 12/2014 |
| KR | 101740596 B1 | 5/2017 |
| KR | 20170143310 A | 12/2017 |
| KR | 20190088185 A | 7/2019 |
| NL | 182288 B | 9/1987 |
| WO | 9820352 A2 | 5/1998 |
| WO | 2010013704 A1 | 2/2010 |
| WO | 2010093694 A1 | 8/2010 |
| WO | 2019098532 A1 | 5/2019 |

OTHER PUBLICATIONS

Extended European Search Report including Written Opinion for Application No. 19851428.3 dated Jan. 20, 2021, 9 pages.
International Search Report for Application No. PCT/KR2019/009901, dated Dec. 4, 2019, pp. 1-2.
Shi ZH, Wu QJ, Cai JF. The design and application of vacuum solide phase extraction equipment Chinese Journal of Health Laboratory Technology. 2011:05.
Wu SZ, Mark JE. Some simulations and theoretical studies on poly (dimethylsiloxane). Polymer Reviews. Oct. 1, 2007;47(4):463-85.
Li Peng, "Novel Separation Techniques For Elemental Speciation Anaysis," Dissertation, posted Sep. 30, 2015, Analytical Chemistry, China.
Search Report from Office Action for Chinese Application No. 2019800057636 dated May 24, 2021; 4 pages.

* cited by examiner

[Fig. 1a]
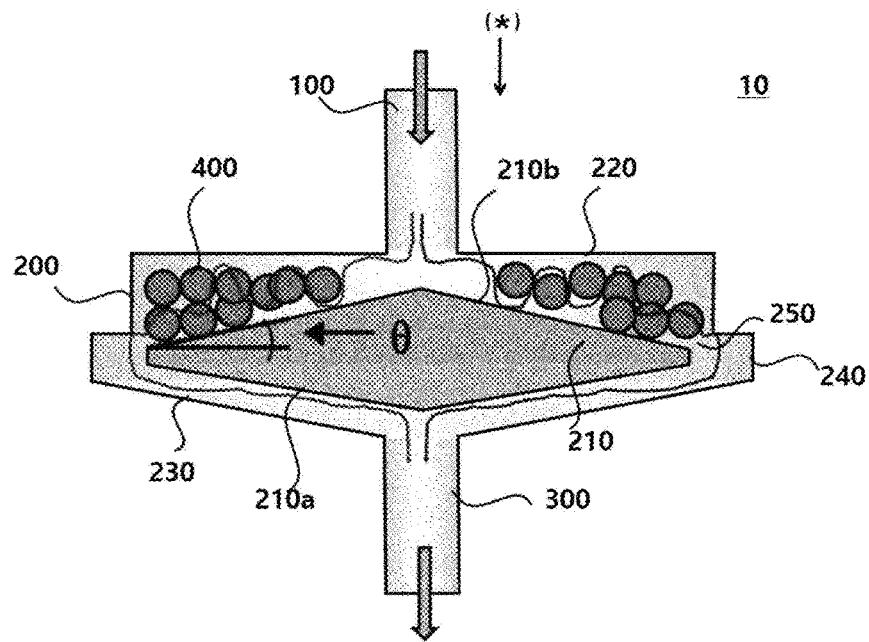
[Fig.1b]
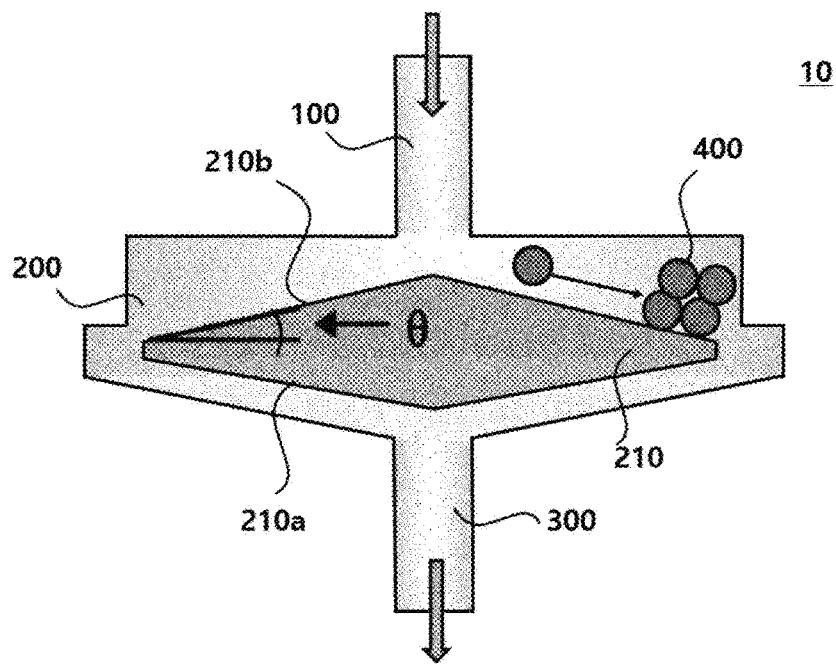

[Fig.1c]
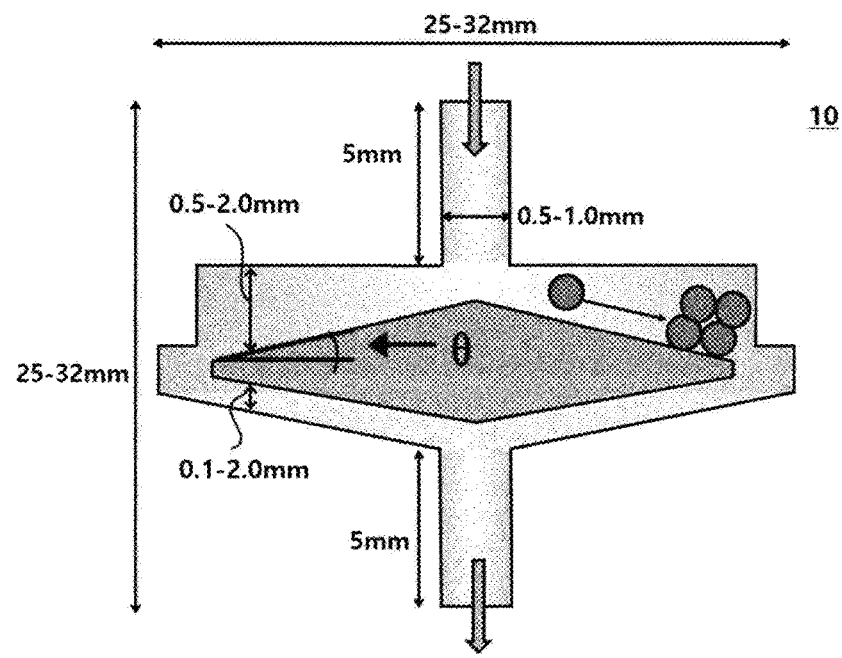
[Fig.2]
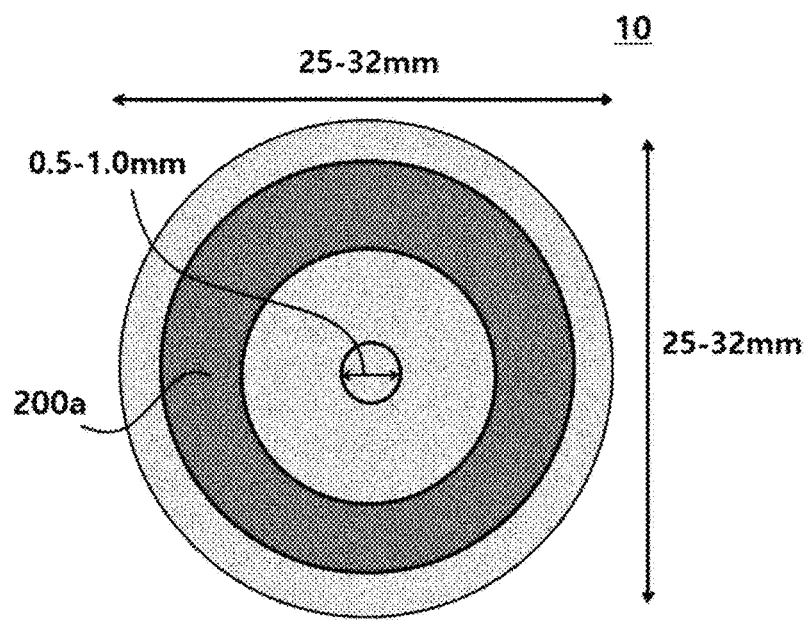

[Fig. 3]
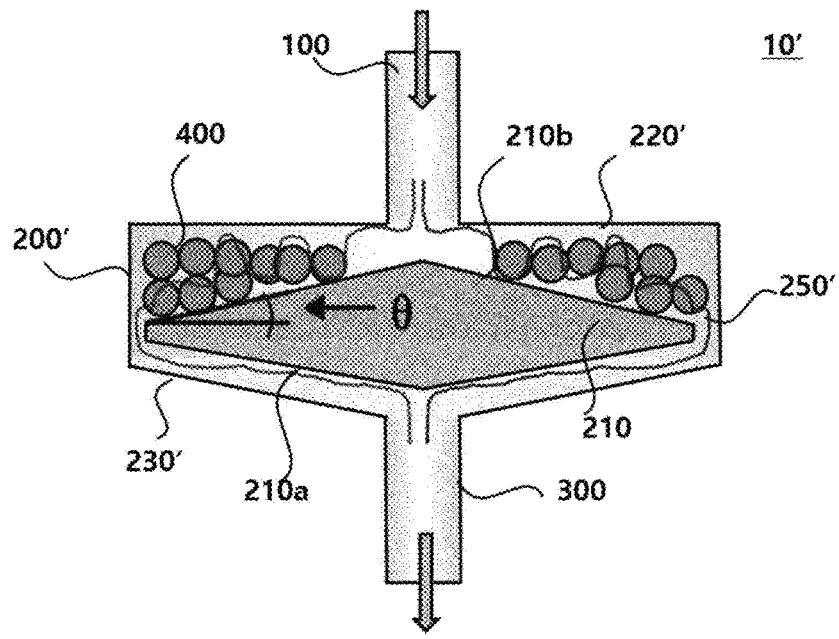
[Fig. 4a]
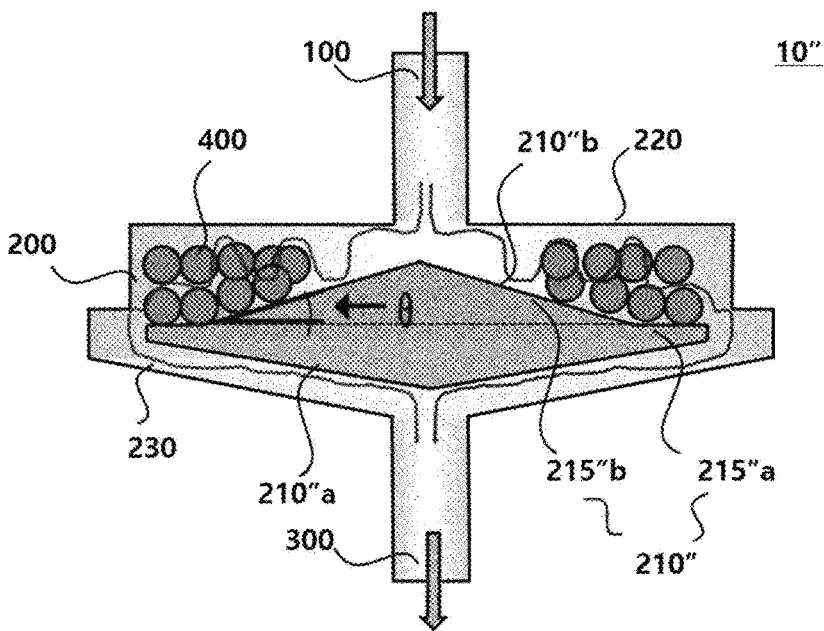

[Fig. 4b]
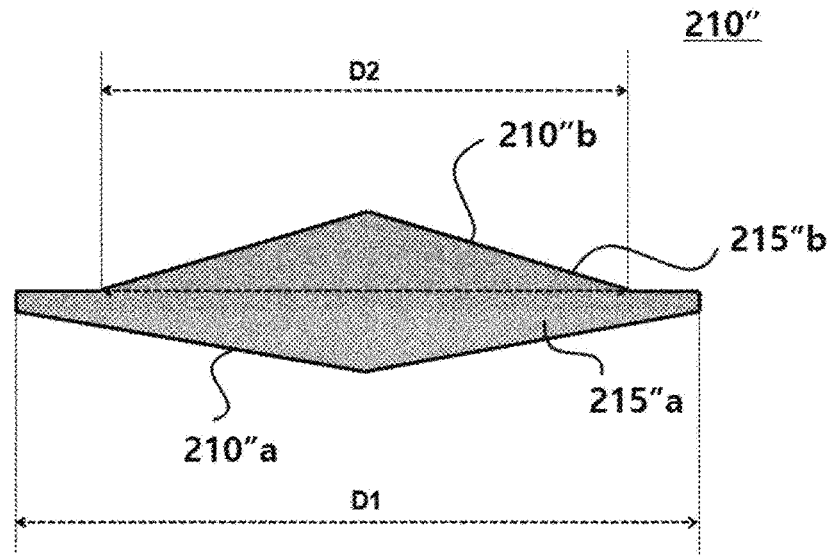
[Fig. 5]
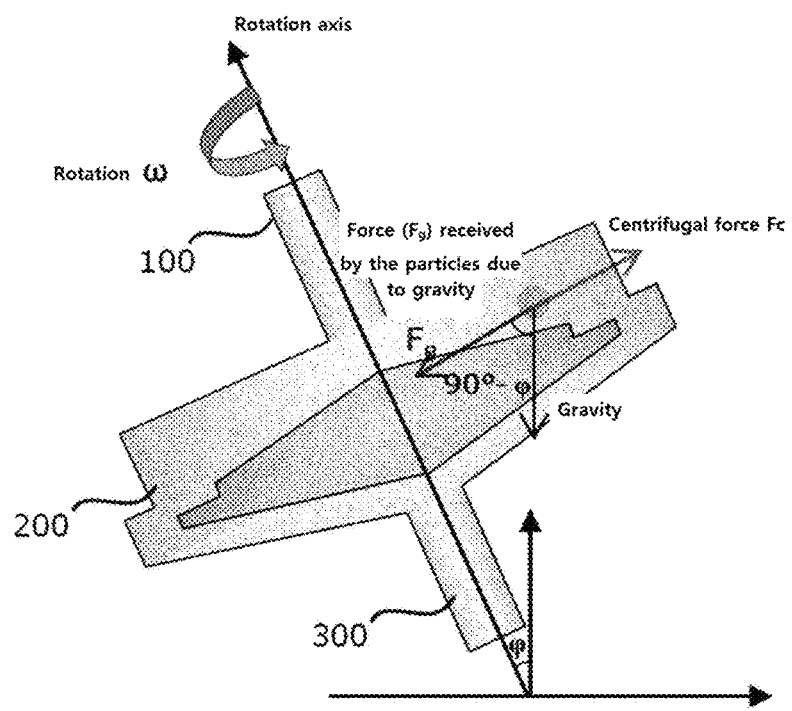

[Fig. 6]
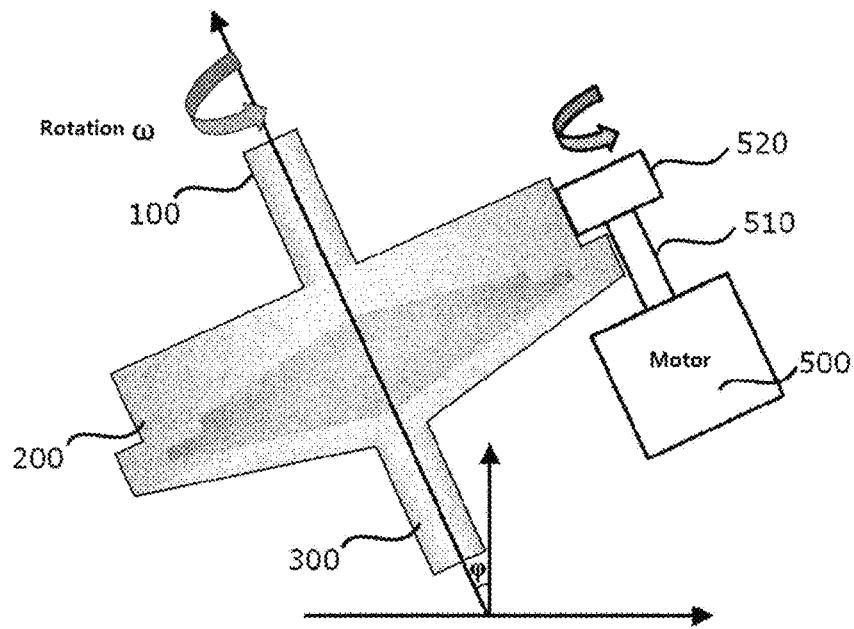
[Fig. 7a]
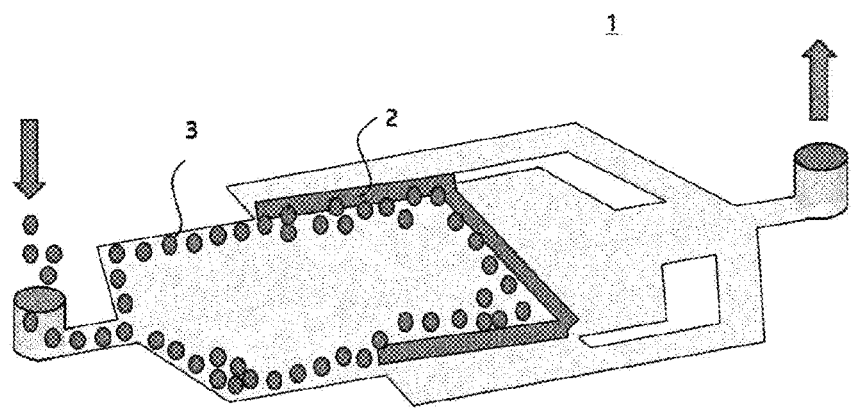

[Fig. 7b]
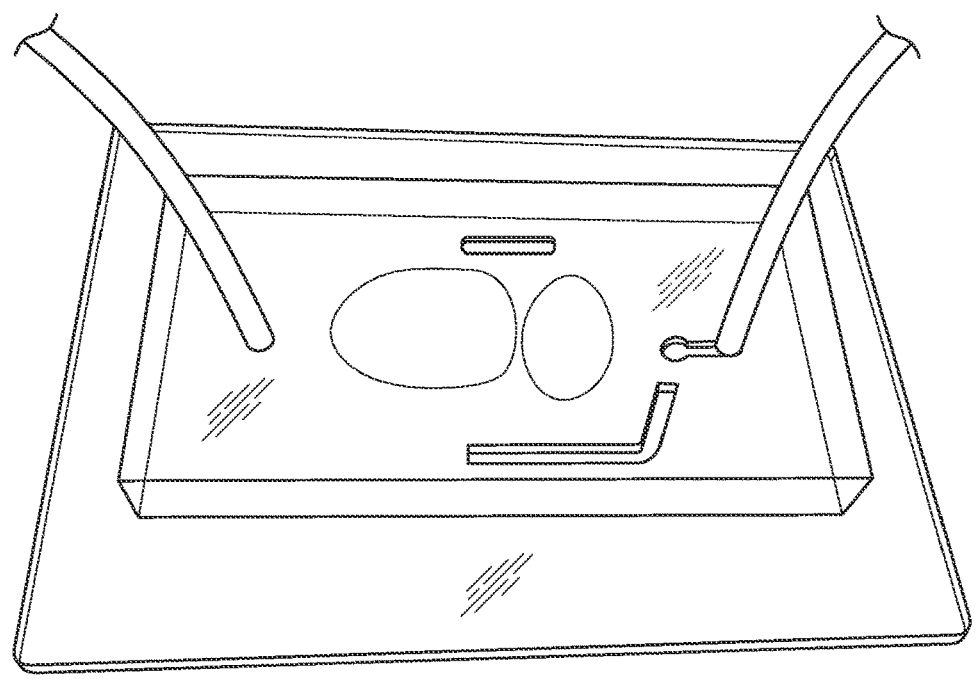
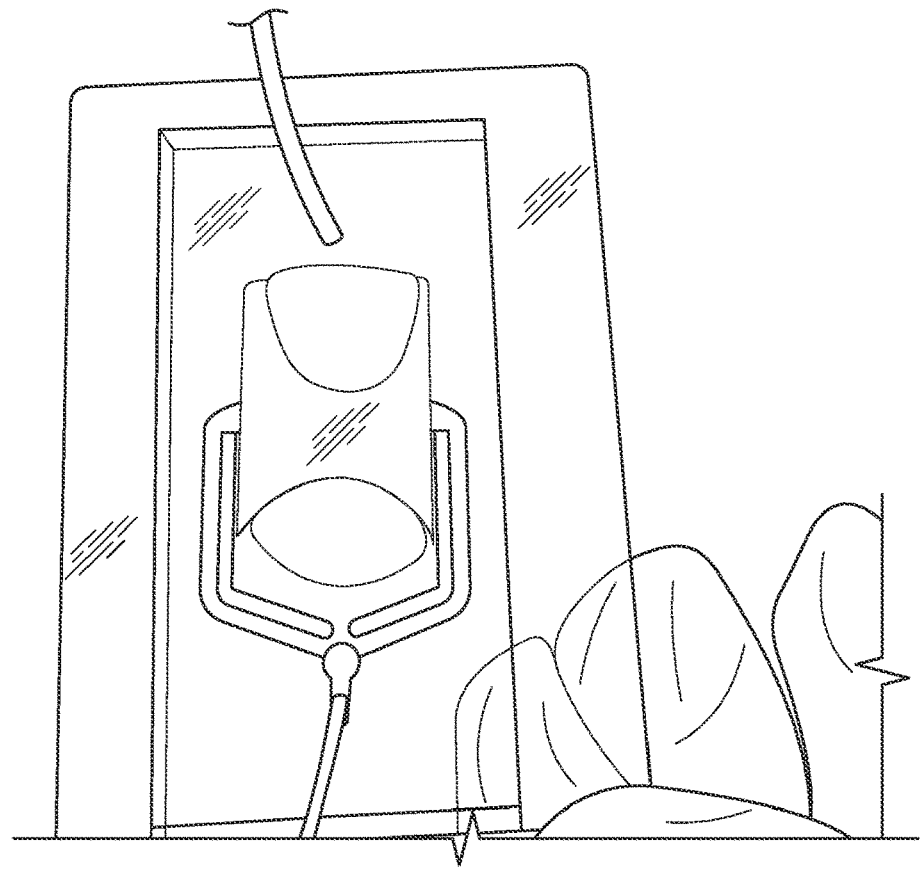

SOLID PHASE EXTRACTION METHOD USING MICRO DEVICE

CROSS-REFERENCE TO RELATED APPLICATIONS

This application is a national phase entry under 35 U.S.C. § 371 of International Patent Application No. PCT/KR2019/009901, filed on Aug. 7, 2019, published in Korean, which claims priority from Korean Patent Application Nos. 10-2018-0097181, filed on Aug. 21, 2018 and 10-2019-0095313, filed on Aug. 6, 2019, the entire disclosures of which are incorporated herein by reference.

BACKGROUND OF THE INVENTION

1. Field of the Invention

The present invention relates to a method of solid phase extraction with a micro device, and more particularly, to a method of solid phase extraction with a micro device capable of performing solid phase extraction by adding a filler and a solvent.

2. Description of the Related Art

Solid phase extraction is a method in which a target material is adsorbed onto a filler having a specific property, such as beads, and purified and concentrated using a solvent to perform a pretreatment. In this case, a device for packing the filler is required. A micro device having a small size is used in order to increase a recovery rate and shorten a pretreatment time. In addition, a micro device is used to detect trace amounts of materials. The use of a micro device has advantages of being environmentally friendly since it can reduce solvent consumption.

The shape of the conventional micro device for solid phase extraction 1 is as shown in FIGS. 7a and 7b. There is provided a dam 2 inside the micro device 1 so that beads 3 could not pass through but only the fluid flows. At this time, as the flow path is reduced due to packing of beads in the rear end portion 210b of the dam, differential pressure is generated. The smaller the porosity of voids, the greater the differential pressure. In the conventional micro device of FIGS. 7a and 7b, a dam is installed on the left side, the right side, and the center of the device. Accordingly, a larger amount of fluid flows in the left and right directions, in which filling distance of the beads is relatively short. As a result, there is generated a non-uniform flow distribution of the fluid.

SUMMARY OF THE INVENTION

In order to solve the non-uniform flow distribution of the fluid of the conventional micro device for solid phase extraction, there is a need for a method of solid phase extraction with a new type of a micro device for solid phase extraction capable of realizing uniform extraction by a uniform flow rate of fluid, in particular, a method of solid phase extraction, by allowing a new type of a micro device for solid phase extraction to be uniformly filled with fillers.

In order to solve the above problems, the present invention provides a solid phase extraction method with a micro device having a dam-forming portion including a dam, the method comprising the steps of:

(i) injecting a solvent and a filler into the micro device to move to a dam-forming portion including a dam adjusted to allow only the solvent to flow through but the filler not to pass through, thereby adsorbing a material to be separated onto the filler in the dam-forming portion; and (ii) extracting the adsorbed material to be separated from the filler, wherein in one step of the steps (i) and (ii), the micro device is rotated about a central axis, and the rotation of the micro device is performed at an angular velocity defined by Equation 1 below.

$$\omega > \sqrt{\frac{g}{r}\cos(90° - \varphi)} \quad \text{[Equation 1]}$$

wherein,
ω is a rotational angular velocity of the micro device,
g is an acceleration of gravity,
r is a radius of the micro device,
φ is an orientation of the micro device, and is in the range of 0<φ<90.

The micro device for solid phase comprises an inlet for injecting a solvent and a filler; an outlet for discharging the solvent; and a dam-forming portion located between the inlet and the outlet, the dam-forming portion including a dam that allows only the solvent to flow through but the filler not to pass through, wherein each of the dam-forming portion and the dam has a circular cross section with respect to a central axis in a direction in which the inlet extends, the cross section being perpendicular to the central axis, and wherein the filler is filled in the form of disk with respect to the central axis in the dam-forming portion.

In addition, in the solid phase extraction method according to the present invention, the rotational angular velocity of the micro device for solid phase extraction may be defined in Equation 1-1 below:

$$\omega > \sqrt{\frac{g}{r_{dam}}\cos(90° - \varphi)} \quad \text{[Equation 1-1]}$$

wherein,
ω is a rotational angular velocity of the micro device,
g is an acceleration of gravity,
$r_{dam}$ is a radius of the dam included in the micro device,
φ is an orientation of the micro device, and is in the range of 0<φ<90.

In the solid phase extraction method according to the present invention, each of the inlet, the outlet, the dam-forming portion, and the dam has a circular cross section with respect to a central axis in a direction in which the inlet extends, the cross section being perpendicular to the central axis, and each of the diameter of the inlet and the diameter of the outlet may be smaller than the diameter of the dam-forming portion.

In addition, in the solid phase extraction method according to the present invention, the rear end portion of the dam which is a surface facing the inlet of the dam may have a conical shape protruding toward the inlet.

In addition, in the solid phase extraction method according to the present invention, the micro device for solid phase extraction has a first end portion connected to the inlet and a second end portion connected to the outlet which are both ends of the dam-forming portion, wherein the dam may be located closer to the second end portion than the first end portion, and the dam may be located by a predetermined distance away from the second end portion.

In addition, in the solid phase extraction method according to the present invention, each of the second end portion and the surface facing the second end portion of the dam may have a shape protruding toward the outlet.

In addition, in the solid phase extraction method according to the present invention, each of the second end portion and the surface facing the second end portion of the dam may have a conical shape protruding toward the outlet.

In addition, in the solid phase extraction method according to the present invention, the filler may be in the form of beads.

In addition, in the solid phase extraction method according to the present invention, the micro device for solid phase extraction is rotated by a motor, the motor includes a driving unit for providing rotational power, a rotation shaft connected to the driving unit, and a head connected to the rotation shaft, and the micro device for solid phase extraction may be rotated by contacting an outer surface of the micro device for solid phase extraction with the head of the motor.

Effect of the Invention

According to the method of solid phase extraction with the micro device for solid phase extraction of the present invention, it is advantageous that a uniform fluid flow is formed along the central axis of the micro device for solid phase extraction without biasing the flow of the filler and solvent, thereby realizing uniform solid phase extraction.

BRIEF DESCRIPTION OF THE DRAWINGS

FIGS. 1a to 1c show a front view of an embodiment of a micro device for solid phase extraction used in the solid phase extraction method of the present invention.

FIG. 2 shows a top view of a micro device for solid phase extraction of FIG. 1a.

FIG. 3 shows a front view of other embodiment of a micro device for solid phase extraction used in the solid phase extraction method of the present invention.

FIGS. 4a and 4b show a front view and a main part of another embodiment of a micro device for solid phase extraction used in the solid phase extraction method of the present invention.

FIG. 5 shows the conditions for the fluid having a uniform flow rate without biasing the flow of the filler and solvent in the solid phase extraction method of the present invention.

FIG. 6 shows a case where a motor is provided to rotate the micro device for solid phase extraction in the solid phase extraction method of the present invention.

FIGS. 7a and 7b show a perspective view of a micro device for solid phase extraction according to the prior art and show an experimental example of the flow of the solvent and beads.

DETAILED DESCRIPTION OF THE INVENTION

Hereinafter, a micro device for solid phase extraction used in the present invention and a solid phase extraction method using the micro device for solid phase extraction will be described in detail. The accompanying drawings, which are included to provide a further understanding of the invention, illustrate embodiments of the invention and are not intended to limit the technical scope of the present invention.

In addition, the same or corresponding components will be denoted by the same reference numerals regardless of symbols, and redundant description thereof will be omitted. For convenience of explanation, the size and shape of each component shown may be exaggerated or reduced.

FIGS. 1a to 1c show a front view of an embodiment of a micro device for solid phase extraction used in the solid phase extraction method of the present invention. The micro device for solid phase extraction 10 includes an inlet 100, a dam-forming portion 200, and an outlet 300. A filler 400 (e.g., beads) and a solvent are injected through the inlet 100 and the injected filler 400 and solvent move into the dam-forming portion 200 connected to the inlet 100. The filler 400 is filled in the rear of the dam 210 in the dam-forming portion 200, and the solvent is discharged through the outlet 300 connected to the dam-forming portion 200 via the side surface of the dam 210.

The dam-forming portion 200 of the micro device for solid phase extraction 10 used in the present invention has a shape of cylinder having a circular cross section (or disk having a predetermined length) with respect to a central axis in a direction in which the inlet extends, the cross section being perpendicular to the central axis. The dam-forming portion 200 includes a dam 210 on the side of outlet 300. With respect to both ends of the dam-forming portion having a cylindrical shape, an end of the dam-forming portion 200 connected to the inlet 100 is referred to as a first end portion 220 and an end of the dam-forming portion 200 is connected to the outlet 300 is referred to as a second end portion 230. The dam 210 is located close to the second end portion 230 of the dam-forming portion 200 and the dam 210 is located by a predetermined distance away from the second end portion 230 so that the solvent can flow toward the outlet 300. However, the present invention is not limited to the above. For example, the dam 210 may be manufactured by a perforated plate having holes with a size smaller than that of the filler 400, or a mesh structure such that the filler 400 could not pass therethrough. In this case, the solvent may flow out to the outlet 300, passing through the dam 210 as well as the side surface of the dam 210.

The second end portion 230 protrudes toward the outlet 300, and for example, may have a conical shape as shown in FIG. 1a, in order to minimize resistance due to the second end portion 230 when the solvent which passed by the dam 210 moves toward the outlet 300 in the dam-forming portion 200.

As described above, the dam 210 also has a circular cross section with respect to a central axis in a direction in which the inlet extends, the cross section being perpendicular to the central axis. As shown in FIG. 1a, the front end portion 210a of the dam 210 (the surface where the dam 210 faces the second end portion 230 of the dam-forming portion 200, i.e., the surface facing the outlet 300 of the dam 210) may have a conical shape, like the second end portion 230 having a conical shape.

In addition, according to the present invention, as shown in FIG. 1a, the rear end portion 210b of the dam 210 (the surface where the dam 210 faces the first end portion 220 of the dam-forming portion 200, i.e., the surface facing the inlet 100 of the dam 210) may also have a conical shape. That is, the inclination angle θ of the rear end portion 210b of the dam 210 is greater than 0°. For example, θ may be between 0° and 60°.

First, with the flat surface of the rear end portion 210b of the dam 210 (that is, when 8=0° in FIG. 1a), when the filler 400 is injected into the inlet 100 alone without being mixed with the fluid, the filler 400 may accumulate from the side closer to the inlet 100 of the rear end portion 210b of the dam 210 and then the inlet 100 may be blocked by the filler 400 (see FIG. 5).

According to the present invention, in order to prevent such a phenomenon, the rear end portion 210b of the dam 210 also has a conical shape, so that the filler 400 does not accumulate near the inlet 100 but move radially along the inclined surface of the rear end portion 210b of the dam 210 to accumulate the filler 400.

At this time, the value of δ may be greater than an angle of repose of powder (i.e., filler 400) (i.e., when the rear end portion 210b of the dam 210 as shown in FIG. 5 has a flat surface, an angle of the accumulated filler 400 relative to the rear end portion 210b of the dam 210 having a flat surface). If the value of δ is greater than the angle of repose of the powder, the filler 400 may move more smoothly along the inclined rear end portion 210b of the dam 210. The angle of repose of the powder has various values for various environments in which the present invention is implemented.

FIG. 2 illustrates the shape of the filler 400 filled in the form of a disk in the rear end portion 210b of the dam 210 when viewed in the direction of the arrow (*) of FIG. 1a. The shape in which the filler 400 is filled is indicated by the reference numeral 200a.

Referring back to FIG. 1a, in case that the diameter of the dam-forming portion 200 is equal to the diameter of the dam 210, there is further provided a protruded portion 240 in which a side surface surrounding the portion where the dam 210 is located in the dam-forming portion 200 is further protruded so that the protruded portion 240 allows the solvent to move between the side surface of the dam 210 and the inner surface of the dam-forming portion 200. In this case, the diameter of the second end portion 230 of the dam-forming portion 200 may be greater than the diameter of the first end portion 220 of the dam-forming portion 200. As shown by a flow line of the solvent in FIG. 1a, the solvent may pass between the fillers 400, pass by the protruded portion 240 of the dam-forming portion 200 and pass by a space between the second end portion 230 of the dam-forming portion 200 and the dam 210, and then move toward the outlet 300.

A solvent inlet 250, which is the inlet of the space into which the solvent flows between the side surface of the dam 210 and the inner surface of the dam-forming portion 200, has a width smaller than the diameter of the filler 400.

As described above, the inlet 100 and the outlet 300 may be connected to the dam-forming portion 200 and formed integrally with the dam-forming portion 200. Each of the inlet 100 and the outlet 300 may have a long cylindrical shape, for example. In addition, each of the inlet 100 and the outlet 300 may be located on the same line with respect to the center axis in a longitudinal direction of the dam-forming portion 200. The diameter of each of the inlet 100 and the outlet 300 is smaller than the diameter of the dam-forming portion 200.

A size of the micro device for solid phase extraction 10, for example, as shown in FIG. 1c, a diameter of the micro device for solid phase extraction 10 (i.e., a diameter of the micro device 10 including the protruded portion 240 of the dam-forming portion 200) may be 25 mm to 32 mm, and a total length of the micro device for solid phase extraction 10 (i.e., a total length of the micro device including the inlet 100, the dam-forming portion 200 and the outlet 300) may be about 10.3 mm to 10.45 mm, and in one embodiment may be about 10 mm. A diameter of the filler 400 may be 35 μm to 60 μm. A diameter of the inlet 100 may be 0.5 mm to 10 mm, and a length of the inlet 100 may be about 5 mm. A diameter of the outlet 300 may be 0.5 mm to 10 mm, and a length of the outlet 300 may be about 5 mm. A length from the first end portion 220 of the dam-forming portion 200 to the rear end portion 210b of the dam 210 (i.e., a length of the region in which the filler 400 can be filled) may be 0.5 mm to 2 mm. A length from the front end portion 210a of the dam 210 to the second end portion 230 may be 0.1 mm to 2 mm. A width of the solvent inlet 250 of the protruded portion 240 may be 30 μm to 35 μm to prevent the filler 400 from passing through. The dimensions shown in FIG. 1c are merely examples, and the present invention is not limited thereto, and various modifications and changes may be made to the various environments in which the present invention is implemented.

According to the present invention, since the same filling distance of the filler 400 from the central axis in the longitudinal direction of the dam-forming portion 200 generates a similar differential pressure, a uniform flow distribution of the solvent in the micro device for solid phase extraction 10 can be achieved. Therefore, the dam-forming portion 200 and the dam 210 are designed to be radially symmetric from the central axis so that the fillers 400 are filled at the same distance. Accordingly, the shape of the region 200a filled with the filler 400 becomes a disk shape as shown in FIG. 2, and the inlet 100 and the outlet 300 are located on the central axis. That is, each of the dam-forming portion 200 and the dam 210 has a circular cross section perpendicular to the central axis in the direction in which the inlet 100 extends. In the dam-forming portion 200, the filler 400 is filled in the form of disk with respect to the central axis. As such, when the cross section has a circular shape, the filler 400 is formed in the fluid flow direction with the same distribution from the central axis of the micro device for solid phase extraction 10, thereby eliminating unnecessary volume and maximizing the efficiency of solid phase extraction.

FIG. 3 shows a front view of other embodiment of the micro device for solid phase extraction 10' used in the present invention, in which the dam-forming portion 200 of the micro device for solid phase extraction of FIG. 1a is partially modified. In the micro device for solid phase extraction 10' of FIG. 3, similarly as that shown in FIG. 1a, the rear end portion 210b of the dam 210 (the surface facing the first end portion 220' of the dam-forming portion 200') may also have a conical shape. As shown in FIG. 3, in case that the diameter of the dam 210 is smaller than the diameter of the dam-forming portion 200', the solvent can pass by the side surface of the dam 210, and therefore the dam-forming portion 200' may not need a protruded portion. In this case, a solvent inlet 250', which is the inlet of the space through which the solvent flows between the side surface of the dam 210 and the inner surface of the dam-forming portion 200', has a width smaller than the diameter of the filler 400.

FIG. 4a shows a front view of another embodiment of the micro device for solid phase extraction 10" used in the solid phase extraction method of the present invention, in which the dam 210 of the micro device for solid phase extraction of FIG. 1a is partially modified. FIG. 4b shows only the dam 210" of the micro device for solid phase extraction 10" of FIG. 4a. In the micro device for solid phase extraction 10" of FIG. 4a, similarly as that shown in FIG. 1a, the rear end portion 210"b of the dam 210" (the surface facing the first end portion 220 of the dam-forming portion 200' may also have a conical shape. Referring to FIGS. 4a and 4b, the dam 210" may be divided into a first portion 215"a including the front end portion 210"a and a second portion 215"b including the rear end portion 210"b. A maximum diameter D2 in the circular cross section perpendicular to the central axis of the second portion 215"b (i.e., the central axis in a direction in which the inlet extends), that is, a diameter of the bottom of the conical shape of the second portion 215"b, is small that a maximum diameter D1 in the circular cross section perpendicular to the central axis of the first portion 215"a, that is, a diameter of the bottom of the conical shape of the first portion 210"a. Therefore, when the filler 400 moves radially along the inclined surface of the rear end portion 210"b of the conical shape and accumulates toward the edge of the dam 210", there is an advantage that the value of 8 can be made larger while ensuring a sufficient space for the filler 400 to accumulate toward the edge of the dam 210".

Next, a solid phase extraction method and a solid phase extraction condition according to the present invention will be described with reference to FIG. 5. First, The solid phase extraction method according to the present invention comprises the step (S100) of injecting a solvent and a filler 400 into an inlet 100 of the micro device for solid phase extraction (10, 10', 10") to move to a dam-forming portion including a dam adjusted to allow only the solvent to flow through but the filler not to pass through, thereby adsorbing a material to be separated onto the filler 400 in the dam-forming portion; and the step (S200) of extracting the adsorbed material to be separated from the filler 400. In addition, the solid phase extraction method according to the present invention further comprises the step (S300) of rotating the micro device for solid phase extraction (10, 10', 10") about the central axis. The step (S300) of rotating the solid state extraction micro device (10, 10', 10") about the central axis may performed in any one step of the step (S100) of adsorbing a material to be separated to the filler 400 and the step (S200) of extracting the adsorbed material to be separated from the filler 400.

In the step (S100) of injecting a solvent and a filler 400 into an inlet 100 of the micro device for solid phase extraction (10, 10', 10") to adsorb a material to be separated onto the filler 400, the injected solvent passes through the dam-forming portion (200, 200') and the target material (i.e., the material to be separated) is adsorbed on the filler 400 filled by the dam (210, 210"). In the step (S300) of extracting the adsorbed material, a process of injecting a solvent capable of dissolving the material adsorbed on the filler 400 is performed.

FIG. 5 illustrates the case where the micro devices for solid phase extraction (10, 10', 10") are positioned in an inclined state with respect to the gravity direction, in particular the case where the micro device for the solid phase extraction (10") of FIG. 4a among the micro devices for solid phase extraction (10, 10', 10") is positioned in an inclined state with respect to the gravity direction.

More specifically, the central axis in a direction in which the inlet of the micro device for solid phase extraction (10, 10', 10") extends (hereinafter referred to as "the central axis of the micro device for solid phase extraction") is inclined by φ from the axis of the horizontal plane (i.e., the plane perpendicular to the gravity direction).

As shown in FIG. 5, the micro device for solid phase extraction (10, 10', 10") is designed to be inclined by various angles (φ), considering manufacturing tolerance and installation mistake such as misalignment of the connection shaft between the inlet 100 and the outlet 300. Here, the angle at which the central axis of the micro device for solid phase extraction is inclined by φ from the axis of the horizontal plane (i.e., the plane perpendicular to the gravity direction) is called an orientation of the micro device for solid phase extraction, and φ is in a range of 0<φ<90.

In the case where the micro device for solid phase extraction (10, 10', 10") (more specifically, the central axis of the micro device for solid phase extraction) is inclined from the axis of the horizontal plane (i.e., the plane perpendicular to the gravity direction), the solvent or the filler 400 injected into the inlet 100 may be biased and positioned in the dam-forming unit 200 due to gravity. Accordingly, there is a possibility that the uniform solid phase extraction from the solvent may not be implemented.

According to the present invention, however, in order to implement the uniform solid phase extraction by allowing the solvent and the filler 400 to flow in a uniform flow rate without biasing, the micro device for solid phase extraction (10, 10', 10") rotates about the central axis (S300). At this time, the central axis of the micro device for solid phase extraction (10, 10', 10") is a rotation axis.

In addition, in the step (S300) of rotating the micro device for solid phase extraction (10, 10', 10") about the central axis, the angular velocity ω at which the micro device for solid phase extraction (10, 10', 10") rotates is according to the Equation 1 below.

$$\omega > \sqrt{\frac{g}{r}\cos(90°-\varphi)} \quad \text{[Equation 1]}$$

In the equation, g is an acceleration of gravity, r is a radius of the micro device, and φ is an orientation of the micro device (the angle at which the micro device is inclined in the gravity direction). The radius r of the micro device corresponds to the radius of the dam-forming portion (200, 200').

In FIG. 5, the centrifugal force $F_c$ should be larger than the force $F_g$ received by the particles due to gravity, and in this regard, see Equation 2 below.

$$F_c > F_g \quad \text{[Equation 2]}$$

In addition, with regard to the centrifugal force $F_c$, see Equation 3 to Equation 5 below.

$$F_c = m \cdot r_{filler} \cdot \omega^2 \quad \text{[Equation 3]}$$

In the Equation, m is the mass of the individual particle of the filler 400 at a distance $r_{filler}$ from the central axis in the micro device for solid phase extraction (10, 10', 10").

The distance $r_{filler}$ from the central axis to the filler 400 filled in the micro device for solid phase extraction (10, 10', 10") is close to the radius (r) of the micro device for solid phase extraction (10, 10', 10"). It is expressed as Equation 4 as follows.

$$r_{filler} \approx r \quad \text{[Equation 4]}$$

Accordingly, the centrifugal force ($F_c$) is expressed as Equation 5 below.

$$F_c \approx m \cdot r \cdot \omega^2 \quad \text{[Equation 5]}$$

With regard to the force $F_g$ received by the particles due to gravity, see Equation 6 below.

$$F_g = m \cdot g \cdot \cos(90°-\varphi) \quad \text{[Equation 6]}$$

If Equation 5 and Equation 6 are substituted into Equation 2 respectively, the condition of the rotational angular velocity ω of rotating the micro device for solid phase extraction (10, 10', 10") for uniform distribution of charging flow rate in the step (S200) of rotating the micro device for solid phase extraction (10, 10', 10"), can be derived from Equation 1 below.

$$\omega > \sqrt{\frac{g}{r}\cos(90° - \varphi)}$$ [Equation 1]

In the equation, g is an acceleration of gravity, r is a radius of the micro device, and φ is an orientation of the micro device.

Additionally, the angular velocity ω at which the micro device for solid phase extraction (10, 10', 10") rotates may be, for example, 1.5 times or more the value of $$\sqrt{\frac{g}{r}\cos(90° - \varphi)},$$

or for example 10,000 times or less the value of $$\sqrt{\frac{g}{r}\cos(90° - \varphi)},$$

or for example 1.5 time or more and 10,000 times or less the value of $$\sqrt{\frac{g}{r}\cos(90° - \varphi)}.$$

The angular velocity ω at which the micro device for solid phase extraction (10, 10', 10") rotates is preferably as large as possible within the range in which solid phase extraction is performed by injecting the solvent or beads into the device (10, 10', 10").

Alternatively, the distance $r_{filler}$ from the central axis to the filler 400 filled in the micro device for solid phase extraction (10, 10', 10") is close to the radius (r) of the micro device for solid phase extraction (10, 10', 10"), in particular to the radius ($r_{dam}$) of the dam (210, 210") of the micro device for solid phase extraction (10, 10', 10"). It is expressed as Equation 4-1 as follows.

$$r_{filler} \approx r_{dam}$$ [Equation 4-1]

Accordingly, the centrifugal force $F_c$ is expressed as Equation 5-1 below.

$$F_c \approx m \cdot r_{dam} \cdot \omega^2$$ [Equation 5-1]

If Equation 5-1 and Equation 6 are substituted into Equation 2 respectively, the condition of the rotational angular velocity φ of rotating the micro device for solid phase extraction (10, 10', 10") for uniform distribution of charging flow rate in the step (S200) of rotating the micro device for solid phase extraction (10, 10', 10"), can be derived from Equation 1-1 below.

$$\omega > \sqrt{\frac{g}{r_{dam}}\cos(90° - \varphi)}$$ [Equation 1-1]

In the equation, g is an acceleration of gravity, $r_{dam}$ is a radius of the dam (210, 210") included in the micro device, and φ is an orientation of the micro device. Referring to FIGS. 4a to 4b, as described above, the dam 210" may be divided into a first portion 215"a including the front end portion 210"a and a second portion 215"b including the rear end portion 210"b. If desired, $r_{dam}$ may be a radius of the first portion 215"a including the front end portion 210"a, or a radius of the second portion 215"b including the rear end portion 210"b.

Additionally, the angular velocity ω at which the micro device for solid phase extraction (10, 10', 10") rotates may be, for example, 1.5 times or more the value of $$\sqrt{\frac{g}{r}\cos(90° - \varphi)},$$

or for example 10,000 times or less the value of $$\sqrt{\frac{g}{r}\cos(90° - \varphi)},$$

or for example 1.5 time or more and 10,000 times or less the value of $$\sqrt{\frac{g}{r}\cos(90° - \varphi)}.$$

The angular velocity ω at which the micro device for solid phase extraction (10, 10', 10") rotates is preferably as large as possible within the range in which solid phase extraction is performed by injecting the solvent or beads into the device (10, 10', 10").

Additionally, the step (S300) of rotating the micro device for solid phase extraction (10, 10', 10") may comprise rotating the micro device for solid phase extraction (10, 10', 10") with the condition of the angular velocity ω of Equation 1. Alternatively, the step (S300) of rotating the micro device for solid phase extraction (10, 10', 10") may comprise rotating the micro device for solid phase extraction (10, 10', 10") with the condition of the angular velocity ω of Equation 1-1.

FIG. 5 illustrates the case where the micro device for the solid phase extraction (10") of FIG. 4a among the micro devices for the solid phase extraction (10, 10', 10") is positioned in an inclined state. However, the solid phase extraction method of the present invention is not limited to the case of the micro device for the solid phase extraction (10") of FIG. 4a, and is equally applied to the micro device for the solid phase extraction (10, 10'). In addition, the solid phase extraction method of the present invention is not limited to the case where the rear end portion (210b, 210"b) of the dam has a conical shape as shown in FIG. 1 and FIG. 4b, and is equally applied to the case where the rear end portion (210b, 210"b) has a flat planar shape.

FIG. 6 shows a case where a rotary motor 500 is provided to rotate the micro device for solid phase extraction (10, 10', 10") in the solid phase extraction method of the present invention. In exemplary embodiments, the rotary motor 500 includes a driving unit (not shown) for providing rotational power, a rotation shaft 510 connected to the driving unit, and a head 520 connected to the rotation shaft 510. The rotary motor 500 is rotated by the rotation of the driving unit. By contacting an outer surface of the micro device for solid phase extraction (10, 10', 10") with the head 520, the micro device for solid phase extraction (10, 10', 10") can be rotated. The rotary motor 500 may be a microminiature rotary motor. The present invention is not limited to the case illustrated in FIG. 6, and a rotary motor 500 may be provided near the inlet 100 or the outlet 300 to rotate the micro device for solid phase extraction (10, 10', 10"). Modifications and variations are possible by applying various means or methods other than the rotary motor 500 as long as they can rotate the micro device for solid phase extraction (10, 10', 10").

It will be understood by those skilled in the art that various changes in form and details may be made therein without departing from the spirit and scope of the invention as defined by the appended claims. Therefore, it should be understood that the above-described embodiments are illustrative in all aspects and not restrictive. In addition, the scope of the present invention is indicated by the following claims rather than the above detailed description. Also, all changes or modifications derived from the meaning and scope of the claims and their equivalents should be construed as being included within the scope of the present invention.

| Description of Symbols | |
|---|---|
| S100: Step of injecting a solvent and a filler into an inlet of the micro device for solid phase extraction to adsorb a material to be separated onto the filler 400 | |
| S200: Step of extracting the adsorbed material to be separated from the filler | |
| S300: Step of rotating the micro device for solid phase extraction | |
| 10: Micro device for solid phase extraction | |
| 100: Inlet | 200: Dam-forming portion |
| 210: Dam | 220: First end portion |
| 230: Second end portion | 240: Protruded portion |
| 250: Solvent inlet | 300: Outlet |
| 400: Filler | |

What is claimed is:

1. A solid phase extraction method using a micro device having a dam-forming portion including a dam, the method comprising the steps of:
   (i) injecting a solvent and a filler into the micro device, such that the solvent and the filler move to the dam-forming portion, the dam allowing the solvent to flow therethrough but not allowing the filler to pass therethrough, thereby adsorbing a material onto the filler in the dam-forming portion; and
   (ii) extracting the adsorbed material from the filler,
   wherein during one step of the steps (i) and (ii), the micro device is rotated about a central axis that extends through a center of the dam-forming portion, and the rotation of the micro device is performed at an angular velocity defined by Equation 1 below, $$\omega > \sqrt{\frac{g}{r}\cos(90° - \varphi)} \quad \text{[Equation 1]}$$

wherein,
ω is a rotational angular velocity of the micro device,
g is an acceleration of gravity,
r is a radius of the dam-forming portion or the dam of the micro device, and
φ is an orientation of the micro device wherein φ is an angle at which the central axis of the micro device is inclined from an axis of a horizontal plane, and is in the range of 0<φ<90.

2. The solid phase extraction method according to claim 1, wherein the micro device comprises an inlet through which the solvent and the filler are injected; and an outlet through which the solvent is discharged, the dam-forming portion being located between the inlet and the outlet,
   wherein each of the dam-forming portion and the dam has a circular cross section with respect to a central axis of the micro device, the central axis extending in a longitudinal direction of the inlet in which the inlet extends, each cross section being perpendicular to the central axis, and wherein the filler is deposited onto the dam in the form of a disk that is centered with respect to the central axis in the dam-forming portion.

3. The solid phase extraction method according to claim 1, wherein the rotational angular velocity of the micro device is further defined in Equation 1-1 below:

$$\omega > \sqrt{\frac{g}{r_{dam}}\cos(90° - \varphi)} \quad \text{[Equation 1-1]}$$

wherein,
$r_{dam}$, is a radius of the dam included in the micro device.

4. The solid phase extraction method according to claim 2,
   wherein each of the inlet and the outlet has a circular cross section with respect to the central axis, the cross section of each of the inlet and the outlet being perpendicular to the central axis, and
   wherein a diameter of the inlet and a diameter of the outlet are each smaller than a diameter of the dam-forming portion.

5. The solid phase extraction method according to claim 2, wherein a rear end portion of the dam which is a surface of the dam facing the inlet has a conical shape protruding toward the inlet.

6. The solid phase extraction method according to claim 2, wherein the dam-forming portion has a first end portion connected to the inlet and a second end portion connected to the outlet, the first end portion and the second end portion being opposite ends of the dam-forming portion, the dam is located closer to the second end portion than the first end portion, and the dam is spaced apart from the second end portion by a predetermined distance.

7. The solid phase extraction method according to claim 6, wherein each of the second end portion and a portion of the dam facing the second end portion has a respective surface protruding toward the outlet.

8. The solid phase extraction method according to claim 7, wherein each of the second end portion and a portion of the dam facing the second end portion has a conical shape.

9. The solid phase extraction method according to claim 1, wherein the filler is in the form of beads.

10. The solid phase extraction method according to claim 1,
    wherein the micro device is rotated by a motor,
    wherein the motor includes a driving unit for providing rotational power, a rotation shaft connected to the driving unit, and a head connected to the rotation shaft, and
    wherein the rotation of the micro device is driven by contact between an outer surface of the micro device and the head of the motor.

* * * * *